(12) United States Patent
Hanna et al.

(10) Patent No.: US 8,212,870 B2
(45) Date of Patent: Jul. 3, 2012

(54) MIRROR SYSTEM AND METHOD FOR ACQUIRING BIOMETRIC DATA

(76) Inventors: Keith J. Hanna, New York, NY (US);
George Herbert Needham Riddle, Princeton, NJ (US); David James Hirvonen, Brooklyn, NY (US); David Hammond Sliney, Fallston, MD (US)

( * ) Notice: Subject to any disclaimer, the term of this patent is extended or adjusted under 35 U.S.C. 154(b) by 174 days.

(21) Appl. No.: 12/658,706

(22) Filed: Feb. 16, 2010

(65) Prior Publication Data

US 2011/0211054 A1  Sep. 1, 2011
US 2012/0127295 A9  May 24, 2012

Related U.S. Application Data

(63) Continuation of application No. PCT/US2008/074751, filed on Aug. 29, 2008, and a continuation of application No. PCT/US2008/074737, filed on Aug. 29, 2008.

(60) Provisional application No. 60/969,607, filed on Sep. 1, 2007.

(51) Int. Cl.
*G06K 9/00* (2006.01)
*G06K 9/46* (2006.01)
(52) U.S. Cl. .................. 348/117; 382/106; 382/190
(58) Field of Classification Search .......... 382/106, 382/117, 190; 351/220, 221
See application file for complete search history.

(56) References Cited

U.S. PATENT DOCUMENTS

| | | | |
|---|---|---|---|
| 4,231,661 A * | 11/1980 | Walsh et al. | 356/340 |
| 6,320,610 B1 | 11/2001 | Van Sant et al. | |
| 6,714,665 B1 * | 3/2004 | Hanna et al. | 382/117 |
| 7,209,271 B2 * | 4/2007 | Lewis et al. | 359/204.1 |
| 7,212,330 B2 * | 5/2007 | Seo et al. | 359/298 |
| 7,418,115 B2 * | 8/2008 | Northcott et al. | 382/117 |

* cited by examiner

*Primary Examiner* — Peling Shaw
(74) *Attorney, Agent, or Firm* — Foley & Lardner LLP; John D. Lanza

(57) ABSTRACT

A system and method for obtaining biometric imagery such as iris imagery from large capture volumes is disclosed wherein a substantially rotationally symmetric mirror such as a cone or sphere is rotated at a constant velocity about a central axis.

8 Claims, 3 Drawing Sheets

MIRROR SYSTEM AND METHOD FOR ACQUIRING BIOMETRIC DATA

CROSS-REFERENCE TO RELATED APPLICATIONS

This application is a continuation of PCT Application. No. PCT/US2008/074751, filed Aug. 29, 2008, now expired, entitled "Mirror System and Method for Acquiring Biometric Data," which claims priority to provisional application 60/969,607, filed Sep. 1, 2007, now expired, entitled "Methodology for Acquiring Biometric Data Large Volumes," which is hereby incorporated by reference. This application is also a continuation of PCT Application No.: PCT/US2008/074737, entitled "System And Method for Iris Data Acquisition For Biometric Identification", filed Aug. 29, 2008, now expired, which is hereby incorporated by reference, which itself claims priority to provisional application 60/969,607, filed Sep. 1, 2007, now expired.

BACKGROUND OF THE INVENTION

This invention relates to systems and methods for acquiring biometric and other imagery, biometric acquisition, identification, fraud detection, and security systems and methods, particularly biometric systems and methods which employ iris recognition with a camera having a field of view. More particularly the invention relates to systems and methods for very quickly acquiring iris imagery within a wide capture volume.

Iris recognition systems have been in use for some time. The acquisition of images suitable for iris recognition is inherently a challenging problem. This is due to many reasons. As an example, the iris itself is relatively small (approximately 1 cm in diameter) and for many identification systems it is desirable to obtain a subject's iris data from a great distance in order to avoid constraining the position of the subject. This results in a small field of view and a small depth of field. Even systems which obtain iris data from a close in subject must be adapted to subjects which do not stay absolutely still. Systems must also deal with subjects which blink involuntarily or drop or swivel their head momentarily to check on the whereabouts of luggage.

There is therefore a need to scan very quickly or else the person will have moved out of the capture volume or the subject's motion will cause a blur. In the current state of the art, attempts to resolve this problem comprise using a flat mirror to scan but such attempts have not so far resolved the motion blur problem, especially when the camera is zoomed in. The image motion in terms of pixels/second is very high which makes it very difficult to obtain high quality imagery with prior art systems in these situations.

In biometric applications, one or more image sensors are often used to collect data for subsequent analysis and biometric matching. For example, with the face or iris biometric, a single camera and lens is often used to collect the biometric data. There is an obvious trade-off between the resolution required for biometric analysis and matching, and the field of view of the lens. For example, as the field of view of the lens increases, the capture volume or coverage in which the biometric data can be observed increases, but the resolution of the data decreases proportionally. Multiple cameras and lenses covering a larger volume is an obvious solution, but it requires the expense of additional cameras, optics and processing.

Another approach for increasing the capture volume has been to use controllable mirrors that point the camera coverage in different locations. Specifically, in U.S. Pat. No. 6,714,665 it is proposed to use a wide field of view camera to determine where to point a mirror that was mounted on a pan/tilt/zoom assembly. However approaches that point mirrors in such a fashion have to handle one or more key problems, namely: (i) the time latency involved in moving the camera to a location, (ii) vibration of the mirror and the resulting settling time of the mirror as it stops and starts motion, (iii) the complexity of the mechanical arrangement, (iv) the reliability, longevity and expense of the opto-mechanical components for such a moving assembly.

U.S. Pat. No. 6,320,610, Van Sant et al disclosed acquisition of biometric data with a mirror on a pan/tilt platform, or a camera on pan/tilt platform. The problem with that approach is that it is very expensive or physically impossible to use such a mechanism to point at 2 or 3 places in a scene at a very high rate—for example, 5-50 times a second. If there is a mechanical mirror or pointing mechanism, then there is substantial inertia preventing the rapid stopping and starting of the assembly quickly and furthermore such a system needs a very powerful actuator/motor to rotate a camera assembly. In addition, there is substantial settling time for the mirror or camera to stop vibrating as the mirror or pan/tilt assembly stops before imagery is acquired, so essentially it makes it almost physically impossible to scan at such high rates.

SUMMARY OF THE INVENTION

It is an object of the present invention to acquire biometric data within large capture volumes with high resolution using fewer cameras, or one camera, and without the problems of prior art systems.

The present invention overcomes the problems of the prior art systems and improves on them by using a continuous mechanical mechanism to solve the inertia problem, and translates that into imagery that stops and stares at one location and then instantaneously jumps to stare at another location.

In one aspect the invention comprises using a rotating curved mirror and tilting which allows the image to appear frozen for a fraction of a second before moving onto the next tile of the scan which also appears frozen.

In another aspect the invention comprises a system for acquiring biometric imagery in a large capture volume from an unconstrained subject comprising a rotationally symmetric mirror, motor means to rotate the mirror at a constant rotational velocity about an axis, and a sensor configured to acquire biometric imagery reflected off of the mirror as it is rotated about the axis.

In some embodiments the rotationally symmetric mirror is comprised of one or more conical sections.

The system can be configured to obtain a set of still images. In some embodiments the system is configured for iris recognition and comprises one or more conical sections arranged to rotate at a substantially constant rotational velocity around their common axis.

In another aspect the invention comprises a reflection device comprising a first surface that reflects light off that surface as if off a substantially rotationally symmetric surface; a second surface different from the first surface that reflects light off that surface as if off a substantially rotationally symmetric surface; wherein said first and said second surfaces are mounted on the same axis such that rotational symmetry of each surface is maintained.

The method aspect of the invention comprises acquiring imagery in a large capture volume by configuring a sensor to view a scene reflected off a non-flat surface; mounting the said surface on a rotating axis; and acquiring imagery of the scene reflected off said surface.

In certain embodiments a set of still images of portions of the scene are obtained.

BRIEF DESCRIPTION OF THE DRAWINGS

These and other objects, features, and advantages of embodiments are presented in greater detail in the following description when read in relation to the drawings, but not limited to these figures, in which.

DETAILED DESCRIPTION

While the invention is capable of many embodiments, only a few embodiments are illustrated in detail herein.

Figure 1:
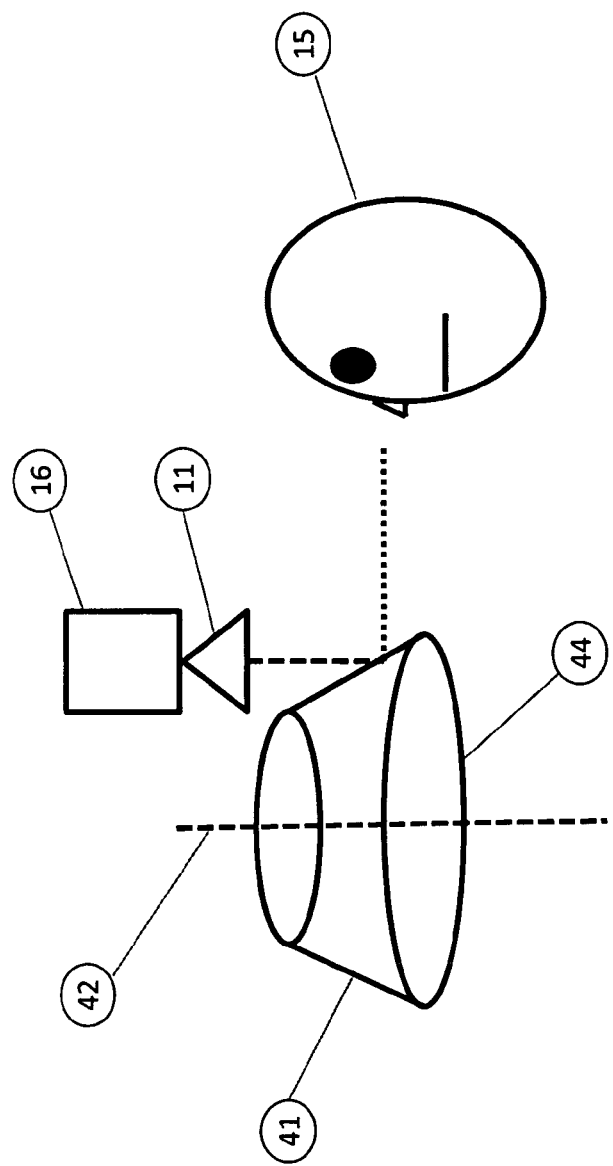
FIG. 1 schematically illustrates a system according to the invention comprising a rotating non-flat, conical shaped mirror, camera and lens, and subject.

FIG. 1 illustrates an embodiment of the invention wherein a first non-flat mirror section 41 is rotated about axis 42 (motor not illustrated), and a second non-flat mirror section 44 is also rotated about axis 42 by the same motor. The lens 11 of the camera 16 receives an image of the subject 15 reflected off surface 44 to the lens 11.

Figure 2:
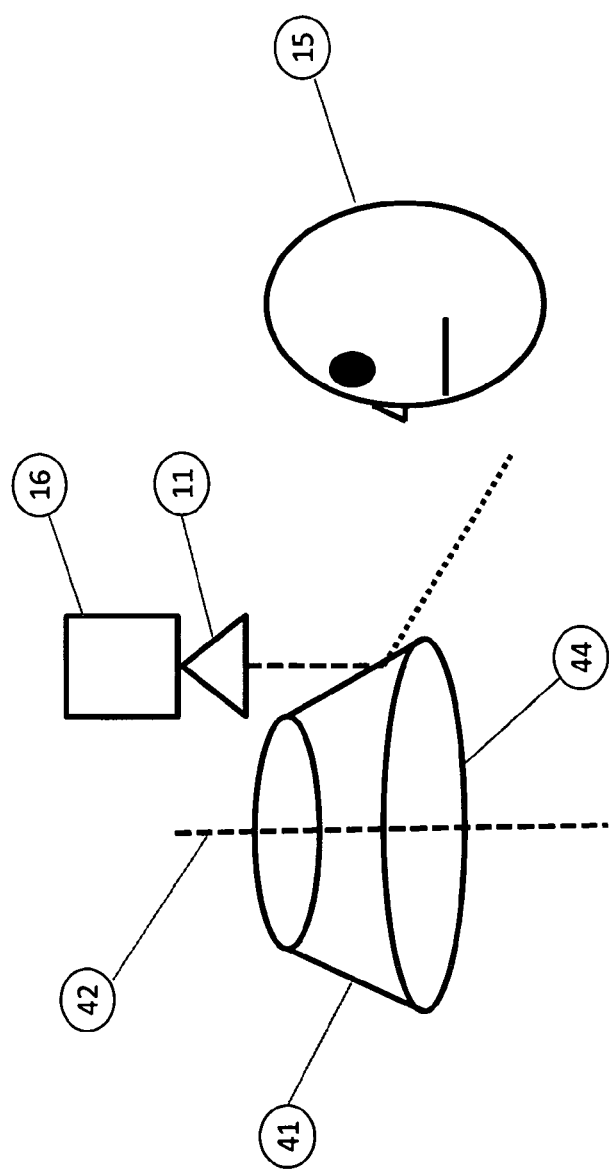
FIG. 2 is a second schematic illustration of a system according to the invention where the camera receives image from a second portion of the subject.

FIG. 2 illustrates the system of FIG. 1 at a different time instant at which an image of the subject 15 is reflected off of surface 41 and a different portion of the subject is reflected off mirror surface 41 to the lens.

Figure 3:
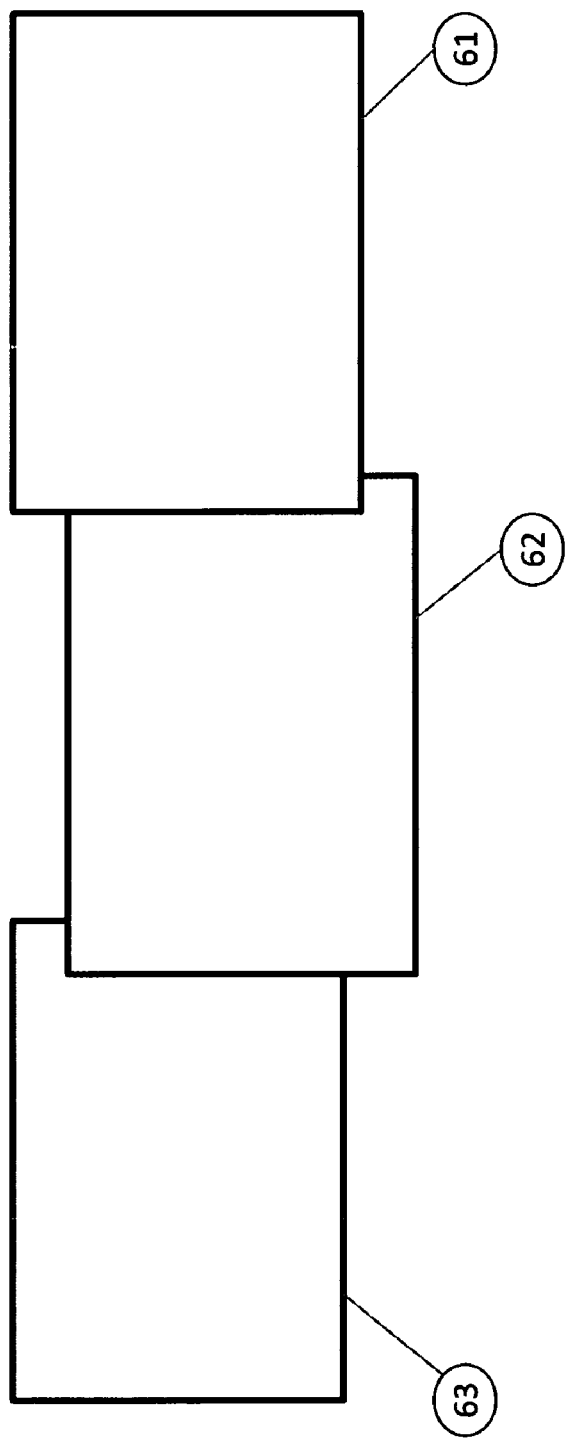
FIG. 3 illustrates the tiling aspect of the invention.

FIG. 3 illustrates a set of three tiles 61-63, which are sections of the subject where the camera imagery points successively.

The following is a general description of a system and method according to the invention. An image is acquired using a camera system 10, 11, or any other image recording device. A camera system us used that can either capture images synchronously at a constant rate, or asynchronously on request by a computer-controlled trigger signal. The camera may be operated at a variable acquisition rate depending on the results of previous processing.

The method is highly effective in many respects. First, if the disposition of the subject is immediately amenable to successful data acquisition (e.g. eyes are open and their face is facing the system), then the system will acquire iris imagery very rapidly.

However, of the subject is fidgeting or unable to remain stationary, or is distracted by baggage or children for example, then the acquisition system will still acquire imagery, although it might take a slightly longer period of time. However, the acquisition time for an amenable user will not be penalized by the system's capability to acquire data in the case of a less amenable user. This is crucial when subject throughput is considered.

The invention performs temporal multiplexing of the camera and optics such that at one time instant the camera sensor acquires data from a first part of the scene and at another time instant the camera sensor acquires data from a second part of the scene, that may or may not substantially overlap the first part of the scene. This process is repeated for additional parts of the scene, until data is once again acquired from the first part of the scene. This process results in tiles which do not substantially overlap as illustrated in FIG. 3. The invention includes a set of configurations of mirrors, cameras and lenses such that this temporal multiplexing and data acquisition throughout a specified capture volume can be performed using opto-mechanical assemblies that move, but have been designed to only move in a fashion such that the mechanics and optics required are highly reliable, have negligible maintenance requirements, require minimal calibration, and are low-cost and small in size.

In this configuration, a non-flat mirror is continually rotated at a constant rotational velocity by a small electrical mirror. The mirror is designed to be reflective in the wavelengths required for the biometric camera acquisition device. The non-flat mirror can, for example, be spherical, conical, or other shapes. In the case of conical shapes, a series of conical sections can be joined together. For example, FIG. 3 shows 3 tiles produced by 3 conical sections joined together on one axis.

The camera, lens, or other imager, and motor are fixed. The motor is designed to rotate at a constant angular velocity. Constant angular motion eliminates mechanical vibration due to stop/start motion and the motor is very reliable. As the mirror rotates, the part of the scene viewed by the lens changes as each different conical mirrored section comes into view of the lens. However, the part of the scene viewed by the lens when each particular conical mirrored sections is in view of the lens does not change even though the mirror is rotating, due to the rotationally symmetric nature of each mirror segment. During this time period of the mirrors rotation, high quality imagery of the scene at a particular location is acquired.

The specific location of the scene that is imaged as the mirror rotates depends on the position on the mirror to which the sensor is pointed.

To illustrate further, if the camera is mounted such that it is pointed at a first substantially rotationally symmetric mirror (FIG. 1, 44), then even though the non-flat mirror is rotating, the portion of view reflected off the mirror remains constant and in this case the imagery is collected from an approximately horizontal direction. As the mirror assembly rotates to bring a second different substantially rotationally symmetric mirror into view. (FIG. 2, 41), then a second portion of the view, in this case the lower portion, is reflected off the mirrored surface and collected.

Additional scan patterns can be implemented by combining two or more mirror/motor assemblies in optical series such that the resultant scan pattern is the combination of each individual scan patterns. More specifically, one rotating mirror assembly can be mounted with a vertical orientation of the axis of rotation, which provides a scan pattern in the vertical direction. A second rotating mirror assembly can be mounted with a horizontal orientation of the axis of rotation such that the optical path reflects off the first mirror assembly and onto the second mirror assembly. The second mirror assembly provides a scan pattern in the horizontal direction. The speed of rotation of each mirror assembly is carefully controlled such that the combination of the vertical and horizontal scan patterns results in a scan pattern that covers a complete 2 dimensional area. For example, if there are 3 separate mirror surfaces within each of the vertical and horizontal mirror assemblies that cover 3 areas in each of the vertical and horizontal directions, then the speed of rotation of one of the assemblies is controlled to be $\frac{1}{3}^{rd}$ the speed of rotation of the other assembly to ensure that the combined scan pattern covers a complete 2 dimensional area. Position sensors, such as optical encoders that are well known in the art, can be used to both measure rotational velocity as well as measure the angular position of each rotating mirror assembly at any time instant in order to optimize the scan pattern such that the scan in one mirror assembly is transitioning from one region to the next at the same time that the scan is transitioning in the second mirror assembly.

This approach allows large capture volumes to be scanned over time. However, one significant remaining problem is that the during biometric data acquisition, the optical path is such that the subject appears to move in the field of view of the camera—in effect, the camera is virtually scanning across the scene. Depending on the integration time of the sensor, this can introduce motion blur in the image data. This can be mitigated by illuminating the subject by stroboscopic lighting, which is a commonly-used technique to stop apparent motion in images acquired where either the camera and/or subject is moving. The stroboscopic illumination can illuminate the subject externally, or can be directed through the moving mirror assembly using a half-silvered mirror in order to direct the illumination directly at the location of interest.

Since the imagery is reflected off a non-flat surface, the imagery is stretched or deformed. The deformation is highly predictable and is given by the shape of the rotationally symmetric surface. After the imagery has been digitized, the stretching or distortion can be removed by applying an inverse geometric image warping function. As an example, "Corneal Imaging System: Environment from Eyes," K. Nishino and S. K. Nayar, International Journal on Computer Vision, October 2006, describe methods of removing distortion off a spherical surface.

In some embodiments two or more conical sections of different pitch (angle) are combined on a single component that spins around an optical axis. The more conical sections that are added, then the more parts of the scene can be scanned. As the conical sections rotate, when the scene is viewed reflected off one conical section, then a certain part of the field of view is observed and appears stationary. When the scene is viewed reflected off a second conical section, then a different part of the field of view is observed and also appears stationary. The advantage is that a wide area of a scene can be scanned extremely rapidly in contrast with a moving pan/tilt mirror system which introduces motion blur or has a slow scan time. In some embodiments, moderate stroboscopic illumination may be used to stop the motion of the individual in the scene.

The angle of the non-flat mirror such as a cone is chosen based on the field of view of the lens and the optical configuration. For example, consider a single cone with a 45 degree pitch. Imagery is reflected by a full 90 degree angle off the conical surface. If the field of view of the imaging system is 10 degrees, then the second conical surface may have a pitch that is 10/2=5 degrees different from the first cone, which is either 40 or 50 degrees depending on whether the desired second part of the scene to be imaged lies above or below the first part of the scene. In practice, the pitch of the second conical surface will be slightly closer to the pitch of the first surface in order to ensure that there is overlap between the regions being imaged.

While the invention has been described and illustrated in detail herein, various other embodiments, alternatives, and modifications should become apparent to those skilled in the art without departing from the spirit and scope of the invention. Therefore the claims should not be considered limited to the illustrated embodiments.

What is claimed is:

1. A system for acquiring biometric imagery in a large capture volume from an unconstrained subject comprising a substantially rotationally symmetric mirror, motor means to rotate the mirror at a constant rotational velocity about an axis, and a sensor configured to acquire biometric imagery reflected off of the mirror as it is rotated about the axis.

2. The system of claim 1 wherein the substantially rotationally symmetric mirror is comprised of one or more conical sections.

3. The system of claim 1 configured to obtain a set of still images.

4. The system of claim 1 configured for iris recognition comprising one or more conical sections arranged to rotate at a substantially constant rotational velocity around their common axis.

5. A reflection device comprising a first surface that reflects light off that surface as if off a rotationally symmetric surface; a second surface different from the first surface that reflects light off that surface as if off a substantially rotationally symmetric surface; wherein said first and said second surfaces are mounted on the same axis such that rotational symmetry of each surface is maintained.

6. A method for acquiring imagery in a large capture volume by configuring a sensor to view a scene reflected off a non-flat surface that reflects light as if off a flat surface; mounting the said surface on a rotating axis such that said surface is not precisely perpendicular to said axis; and acquiring imagery of the scene reflected off said surface.

7. The method of claim 6 wherein a set of still images of portions of the scene are obtained.

8. The method of claim 6 for acquiring imagery comprising pointing a sensor at said reflection device; and rotating said reflection device about the axis.

* * * * *